June 12, 1956 R. H. BODE ET AL 2,750,028
SEPARATORS FOR USE IN THE PACKAGING OF CARTRIDGES
Filed March 25, 1953 5 Sheets-Sheet 1
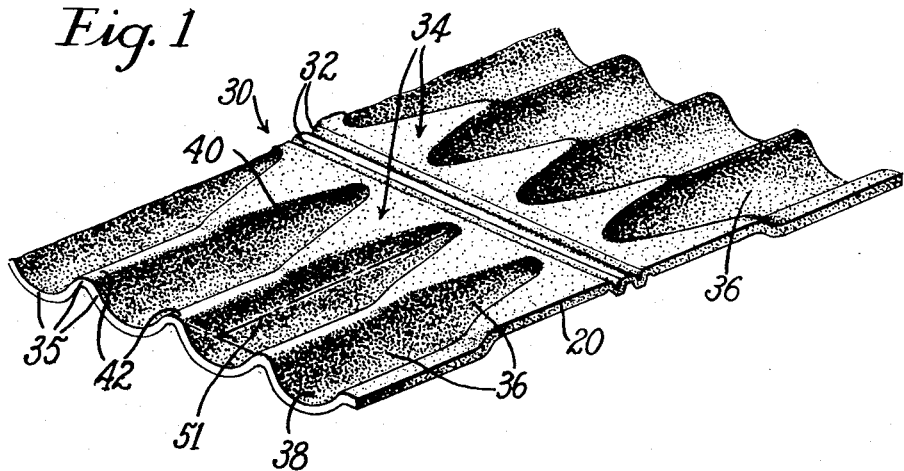
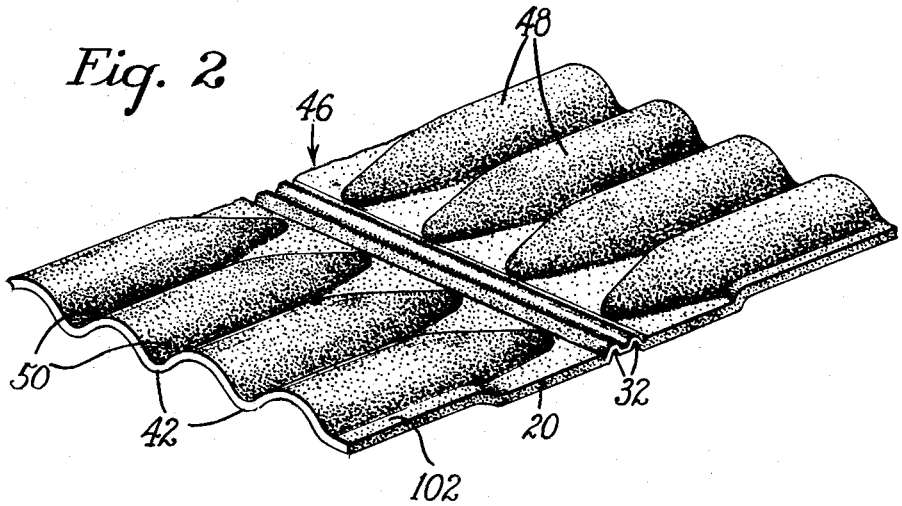
Inventors
Robert H. Bode
Stanley M. Holiday, Jr.
John A. Hawke
By their Attorney June 12, 1956 — R. H. BODE ET AL — 2,750,028
SEPARATORS FOR USE IN THE PACKAGING OF CARTRIDGES
Filed March 25, 1953 — 5 Sheets-Sheet 2
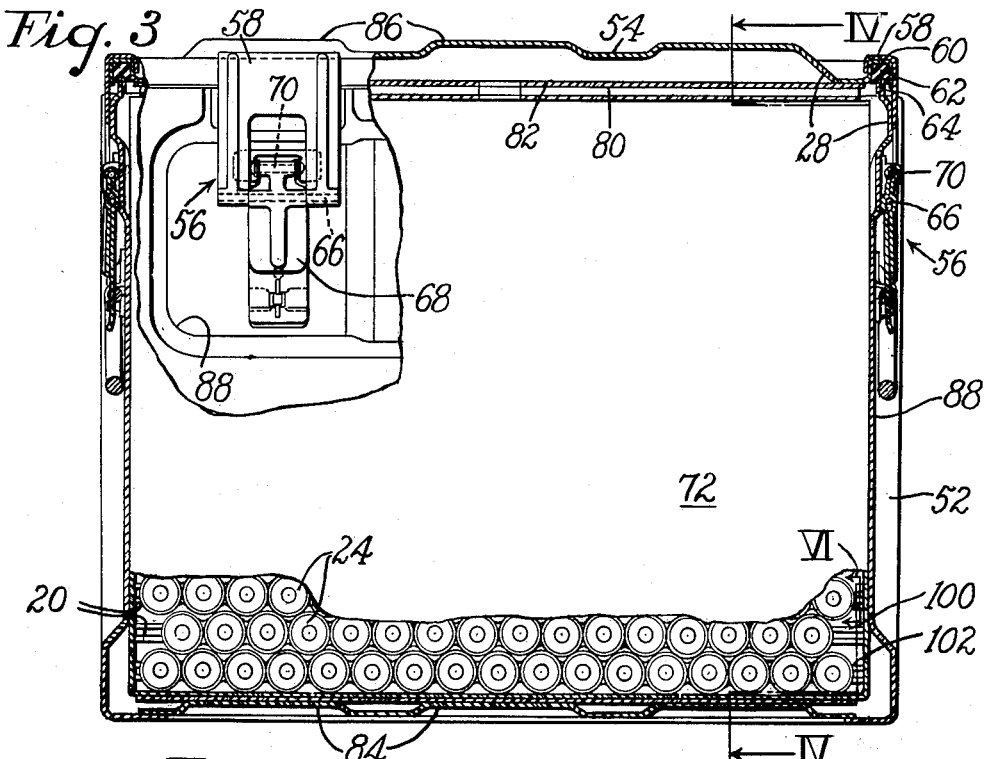
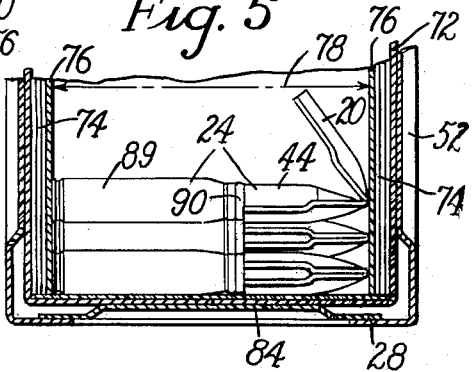
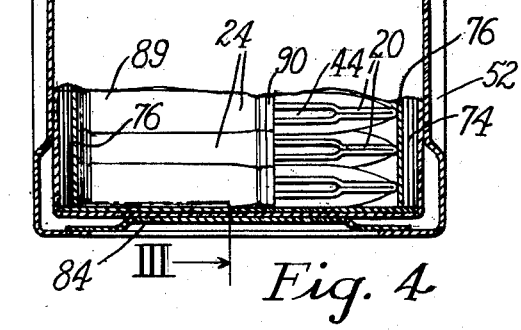
Inventors
Robert H. Bode
Stanley M. Holiday, Jr.
John A. Hawke
By their Attorney
Thomas J. Ryan

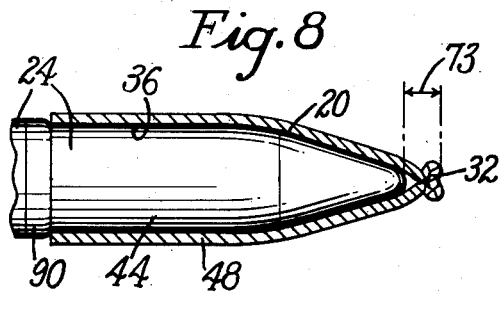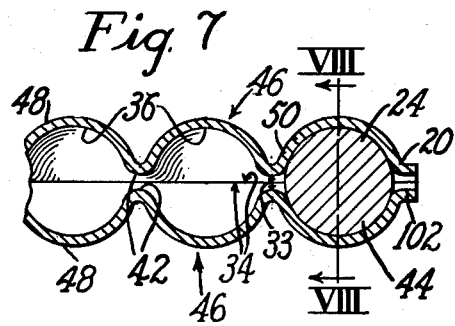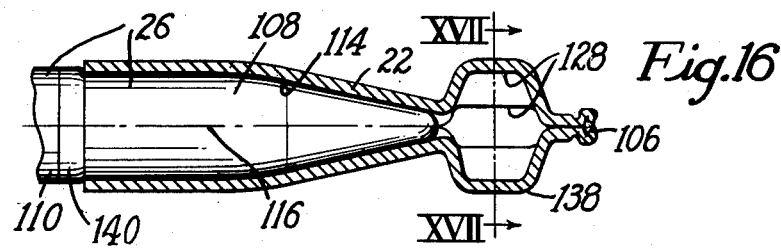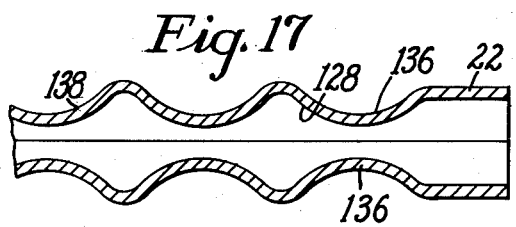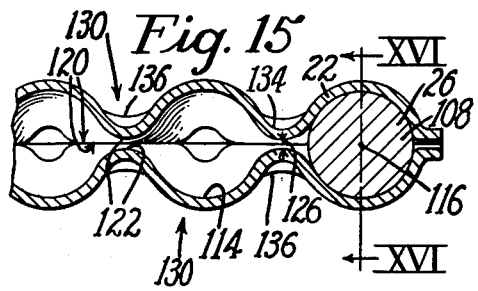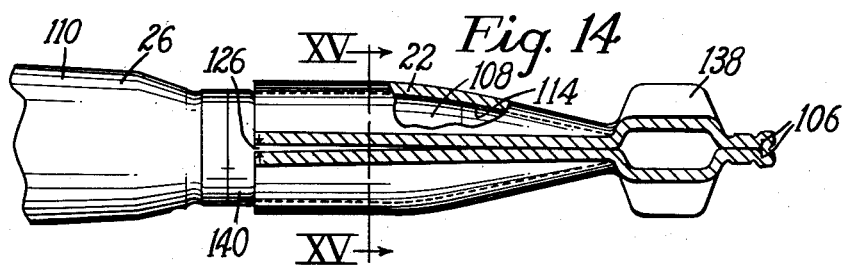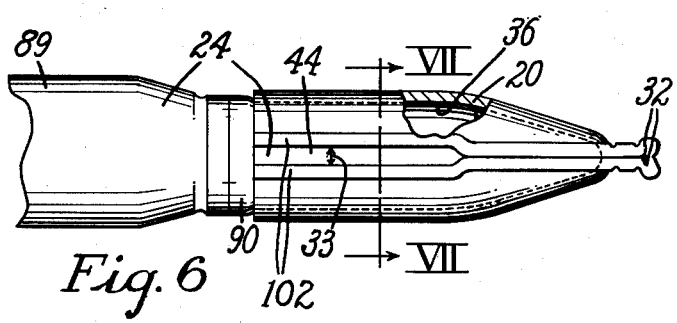

June 12, 1956 R. H. BODE ET AL 2,750,028
SEPARATORS FOR USE IN THE PACKAGING OF CARTRIDGES
Filed March 25, 1953 5 Sheets-Sheet 4

Inventors
Robert H. Bode
Stanley M. Holiday, Jr.
John A. Hawke
By their Attorney
Thomas J. Ryan

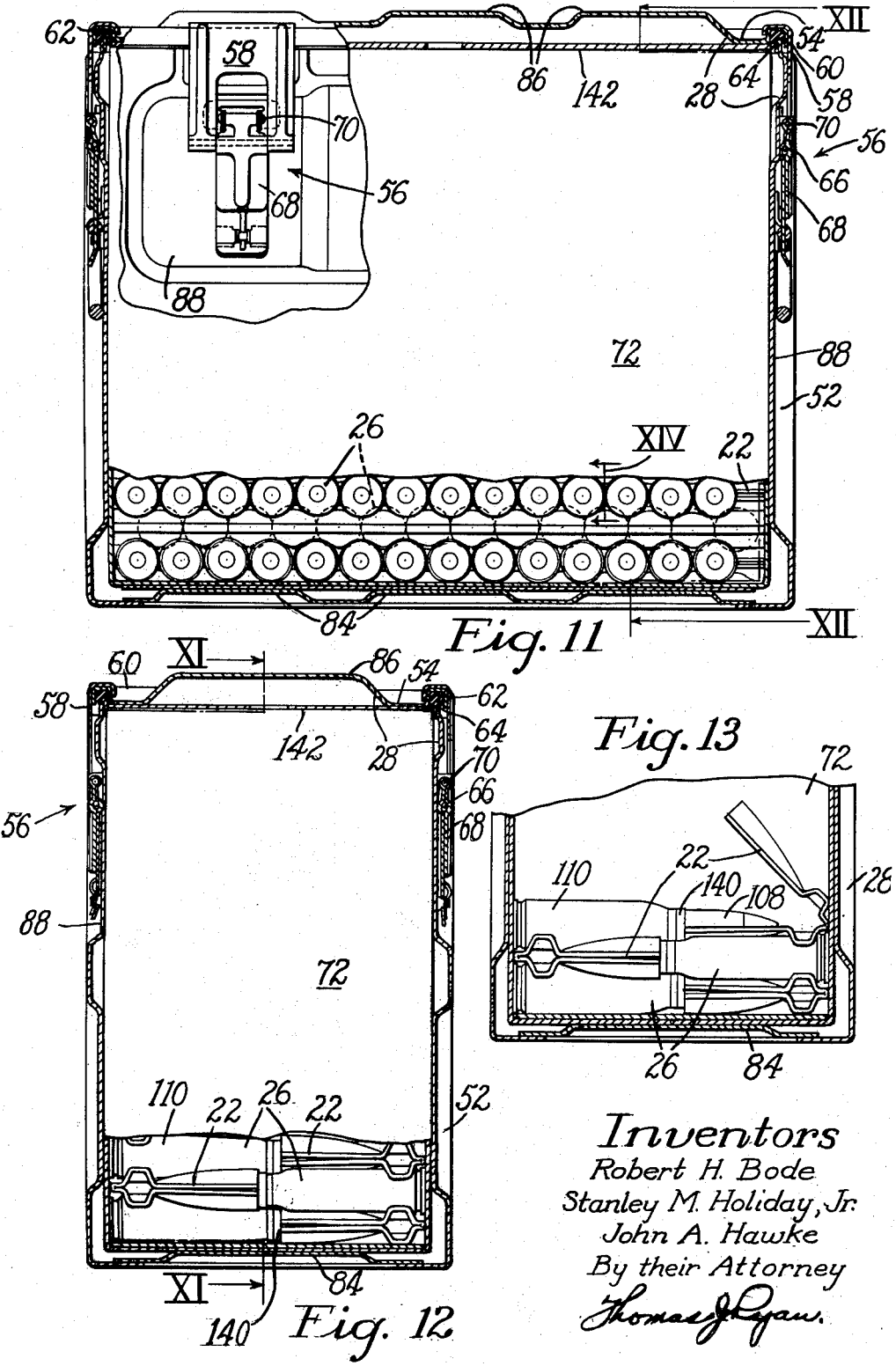

United States Patent Office 2,750,028
Patented June 12, 1956

2,750,028
SEPARATORS FOR USE IN THE PACKAGING OF CARTRIDGES

Robert H. Bode, Wenham, Stanley M. Holiday, Jr., Beverly, and John A. Hawke, Saugus, Mass., assignors, by mesne assignments, to the United States of America as represented by the Secretary of the Navy Application March 25, 1953, Serial No. 344,524

2 Claims. (Cl. 206—3)

This invention relates to separators for use in packing cartridges in boxes for shipment.

Heretofore when a large number of 20 mm. cartridges, for example, have been shipped in a box without prepacking it has been found that because of rough handling during transit crimped connections between the projectiles and the cases of the cartridges are frequently loosened, this condition being highly undesirable since it interferes with the automatic feeding of the cartridges into guns. Moreover, in the shipment of explosive cartridges it occasionally happens that rough handling causes the impact fuses of the cartridges to be detonated. With the foregoing in view it has been common practice to pack 20 mm. cartridges in metal cans, each containing twenty-five cartridges, the projectiles of said cartridges being covered with cylindrical paper sleeves and the cans thereafter being packed into and shipped in boxes containing a plurality of cans. These packing materials are expensive and the time consumed in packing the cartridges and in unpacking the cartridges preparatory to "belting" said cartridges is substantial.

It is an object of the present invention to provide separators by the use of which a large number of 20 mm. cartridges may be packed directly in a box for shipment without the likelihood of said cartridges being damaged during said shipment.

The present invention consists in the hereinafter described novel features, reference being had to the accompanying drawings, which illustrate two embodiments of the invention selected for purposes of illustration, said invention being fully described in the following description and claims.

In the accompanying drawings,

Figs. 1 and 2 show in perspective the inner and outer sides respectively of an illustrative separator used in the packaging of low velocity 20 mm. cartridges;

Fig. 3 shows in section on the line III—III of Fig. 4 an ammunition box which is packed with low velocity 20 mm. cartridges by the use of separators such as shown in Figs. 1 and 2;

Fig. 4 shows the filled ammunition box illustrated in Fig. 3 as viewed on the line IV—IV of Fig. 3;

Fig. 5 is a view similar to the lower end of Fig. 4 showing the ammunition box in the process of being packed;

Fig. 6 is a side view, partly broken away, of an end of a low velocity 20 mm. cartridge in the separator as viewed on the line VI of Fig. 3;

Fig. 7 is a section on the line VII—VII of Fig. 6;

Fig. 8 is a section on the line VIII—VIII of Fig. 7;

Fig. 11 shows in section on the line XI—XI of Fig. 12 the ammunition box which is packed with high velocity 20 mm. cartridges by the use of the separators shown in Figs. 9 and 10;

Fig. 12 shows the box illustrated in Fig. 11 as viewed on the line XII—XII of Fig. 11;

Fig. 13 is a view similar to the lower end of Fig. 12 showing the ammunition box in the process of being packed;

Fig. 14 is a side view, partly broken away, of a high velocity 20 mm. cartridge and its associated separator as viewed on the line XIV of Fig. 11;

Fig. 15 is a section on the line XV—XV of Fig. 14;

Fig. 16 is a section on the line XVI—XVI of Fig. 15; and

Fig. 17 is a section on the line XVII—XVII of Fig. 16.

Figure 9:
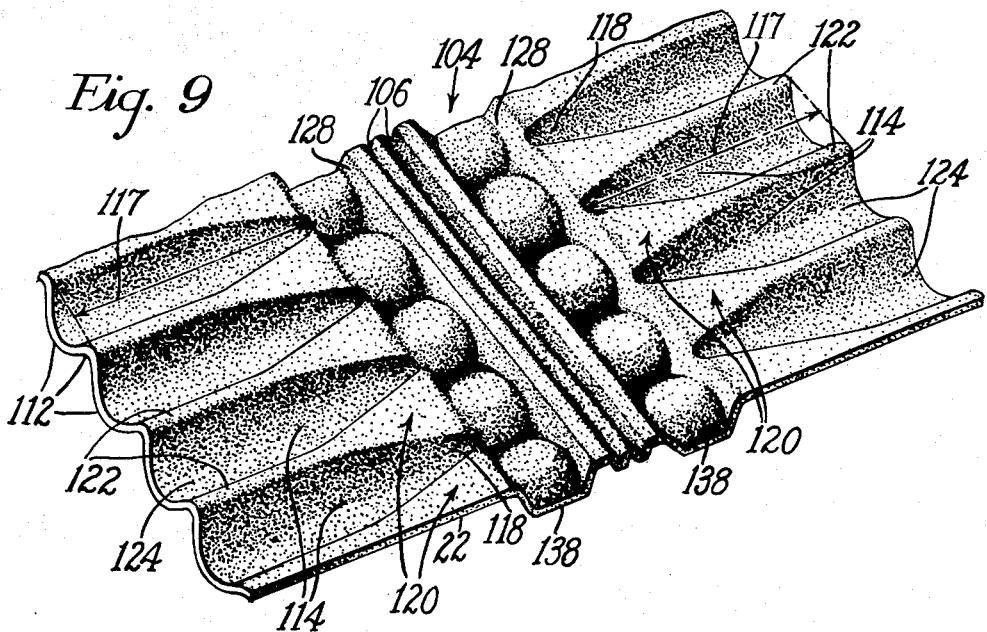
Figs. 9 and 10 are views showing, in perspective, the inner and outer sides respectively of an illustrative separator for use in the packaging of high velocity 20 mm. cartridges.

The present invention is disclosed as embodied in separators 20, 22 for use in the packing of low and high velocity 20 mm. cartridges 24, 26 respectively for shipment in boxes 28 of a well-known type.

The separator 20 is supplied in the flat form shown in Figs. 1 and 2, is molded from paper pulp of substantially uniform thickness and has formed in an inner side 30 (Fig. 1) thereof a pair of centrally arranged longitudinally extending creases 32 (Figs. 1, 2, 6 and 8) which are parallel and serve as a hinge for enabling one-half of the separator to be quickly and effectively folded over the other similar but reversed half, until flat abutment faces 34 (Figs. 1 and 7) of one of said halves engage opposed flat abutment faces of the other of said halves. The inner sides 30 of the halves of the separator 20 also have formed in them, by undulations 35 extending longitudinally of the separator, a plurality of longitudinally spaced projectile shaped recesses 36, the recesses in one half of the separator being transversely alined with recesses in the other half of the separator. Each of the recesses 36 comprises a cylindrical portion 38 and a nose or converging portion 40. The abutment faces 34 which are formed on each half of the separator are continuous and may be regarded as a single face, extending from an adjacent crease 32 to the nose portions 40 of the recesses 36 formed in said halves. Formed between the cylindrical portions 38 of the recesses 36 are ridges 42 (Figs. 1, 2 and 7) which are slightly depressed with relation to the abutment faces 34, the construction and arrangement being such that when said abutment faces of opposite halves of the separator are in engagement opposing ridges 42 are spaced slightly from one another to form gaps 33 (Figs. 6 and 7) and projectiles 44 of the cartridges 24 housed within pockets formed by the opposite recess faces 38 are in substantial contact therewith. The ridges 42 extend from adjacent abutment faces 34 to transverse margins of the halves of the separator 20. The opposite halves of the separator 20 housing the projectiles 44 of the cartridges 24 in the box 28 are subsequently forced toward each other during packing thus insuring that the projectiles shall be firmly gripped to hold them in position in the separator during shipment. An outer side 46 (Figs. 2 and 7) of the separator 20 has formed in its opposite halves projectile-shaped convexities or mounds 48 which are complemental to the recesses 38 formed in the inner side of the separator and between which are included troughs or cavities 50. A lengthwise dimension 51 of each of the projectile-shaped recesses 36 may be described as being disposed at right angles or normal to the hinge formed by the creases 32, and the troughs 50 may be described as being staggered longitudinally of the separator with relation to said recesses.

The box 28 is made of steel parts welded or otherwise secured together and comprises a container or container portion 52 in which the cartridges 24 are packed and a cover or cover portion 54 which may be readily secured to said container by six toggle latches 56 one on each end and two at each side of the container. Each of the latches 56 comprises a hooked plate 58 which may be swung over a hollow marginal U-shaped ridge 60 of the cover 54 and forces a rubber insert 62 in said rib against an upwardly projecting ridge 64 of the container 52 in order effectively to secure the cover in place upon the container and to seal the inside of the container against moisture from the outside. The hooked plate 58 is fulcrumed on a pin 66 carried by an arm 68 journaled upon a pin 70 mounted on the container 52, the construction and arrangement being such that when the hooked plates 58 have been swung over the rib 60 of the cover 54 and the arms 68 have been swung down against the container, toggles formed by the arms and the plates are closed to draw the cover 54 down firmly against the ridge 64 of the container. Fitting inside the container 52 of the box 28 is a strong fiberboard carton 72 which is of double thickness at its bottom. As best shown in Figs. 4 and 5, between opposite sides of the carton 72 and layers of stacked cartridges in the container 52 are corrugated fillers 74 and sheets 76 of fiberboard, a distance 78 between said sheets being equal to the lengths of the cartridges respectively plus a projecting distance 73 (Fig. 8) of each of the separators beyond said cartridges.

After the container 52 has been filled with cartridges 24 and their associated separators 20 a corrugated fiberboard filler 80 and one or more sheets 82 of fiberboard are placed over the top layer of cartridges in the container 52, the cover 54 then being locked upon the container by the use of the latches 56 to press-pack the layers of cartridges in the box 28. The bottoms of the containers 52 of the boxes 28 are provided with recesses 84 for receiving upwardly bowed portions 86 of the covers 54 of other boxes, the construction and arrangement being such that the boxes may be effectively stacked one upon the other. In order that the packed boxes 28 may be stacked solidly against each other the sides of the boxes are provided with recesses 88 in which the toggle latches 56 are included when said latches have been moved to their cover retaining positions.

In packing low velocity cartridges 24 in the containers 52, each of the separators 20, which is usually rendered grease proof and in its flat form shown in Figs. 1 and 2 is approximately 17″ long and 6″ wide, after having been folded about its hinge, is placed in the container 52 with its lower half arranged horizontally and its upper half disposed at about 60° to its lower half as illustrated in Fig. 5 and is filled with cartridges, the cartridges of one layer being staggered lengthwise of the separator as shown in Fig. 3 with relation to the cartridges of adjacent layers by reason of the projectile-shaped mounds 48 of the separators 20 bridging the troughs 50 of separators housing adjacent layers of cartridges, and cases 89 of one layer of cartridges bridging grooves formed between the cases of an adjacent layer of cartridges. The cartridges are then placed manually in the uppermost separator 20 with their projectiles 44 engaging in the recesses 36 of the horizontal half of the separator, and with rotating bands 90 of the projectiles engaging a lateral edge of the lower half of the separator. The upstanding half of the separator 20, in which the cartridges 24 have been positioned, is then folded down over the projectiles of the cartridges in said separator and another or loose separator, the upper half of which is disposed at about 60° to the lower half, is placed upon the separator just filled, the cartridge-shaped mounds 48 of the loose separator being arranged in straddling relation over the troughs 50 of the filled separator. The uppermost separator 20 is then filled with cartridges, as above described, the process continuing until the container 52 of the box 28 is filled. It is desirable that the separators 20 shall be held against lengthwise or longitudinal movement in the container 52 in their proper lengthwise staggered relation to alternate layers of separators. Accordingly, alternate layers of separators 20 are constructed and arranged to receive seventeen and sixteen cartridges respectively, as best shown in Fig. 3, end flanges 100 of the separators which contain sixteen cartridges being longer than end flanges 102 of the separators which contain seventeen cartridges.

The separators 20 retain the cartridges 24 in the box 28 with axes of said cartridges arranged substantially parallel, the separators and the cartridges gripped by the separators being arranged in laterally internested relation so that a maximum number of cartridges may be packed into the box 28. The boxes 28, in which the cartridges 24 have been packed in the manner above described, may be shipped with normal handling without likelihood of the cartridges being damaged.

Figure 10:
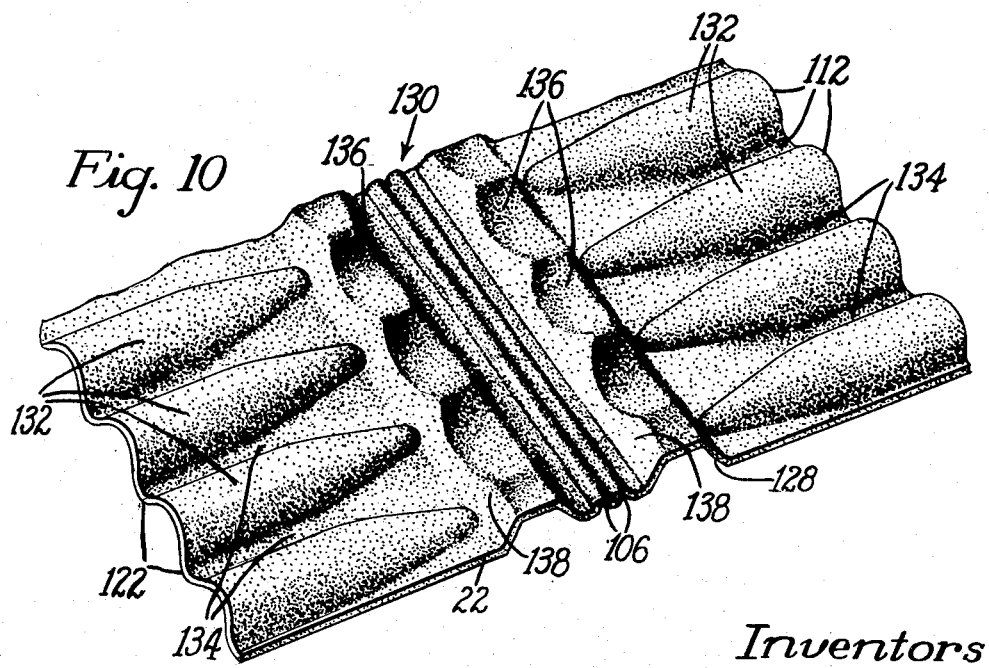

The separator 22 which, as above explained is used in the packaging of high velocity cartridges 26, is supplied in its flat form shown in Figs. 9 and 10 and is molded from paper pulp and has formed at an inner side 104 (Fig. 9) thereof spaced centrally disposed longitudinally extending parallel creases 106 (Figs. 9, 10, 14 and 16) which serve as a hinge for enabling one-half of the separator divided by said hinge to be folded onto the other half to receive projectiles 108 of the cartridges 26 packed in the box 28 (Figs. 11, 12 and 13). The projectiles 108 of the cartridges 26 are of a slightly different shape from the projectiles 44 of the cartridges 24 and cases 110 of the cartridges 26 are of a larger diameter than and tapered more than the cases 89 of the cartridges 24.

Each of the halves of the separators 22 is undulated longitudinally to provide in said halves undulations 112. When the inner side 104 of one of said halves of the separator 22 has been folded over the other there are formed in said separator, by opposing recesses 114, pockets which are generally complemental to the projectiles 108 of the cartridges 26. Axes 116 (Figs. 15 and 16) of the pockets formed by the recesses 114 are disposed at substantially right angles or normal to the creases 106 and pass substantially through the hinge formed by said creases. Lengthwise dimensions 117 of the recesses 114 may be described as being disposed at right angles to the creases 106.

The inner sides 104 of the halves of the separator 22 have formed on them, between nose or converging portions 118 of the recesses 114, series respectively of flat abutment faces 120 engagement of the faces of one series with the faces of the other series limiting folding movement about said hinge of one of the halves of the separator over the other. Ridges 122 (Figs. 9, 10 and 15) which are formed at the inner sides 104 of the separator 22 between cylindrical portions 124 (Fig. 9) of the recesses 114 are angled slightly away from the plane of adjacent abutment faces 120 as they extend away from said faces, the construction and arrangement being such that when the abutment faces of opposite halves of the separator are in engagement with each other angularly shaped gaps 126 (Figs. 14 and 15) are formed between opposing ridges of the halves of the separator, the pockets formed by the recesses 114 at that time being substantially complemental to the projectiles 108 of the cartridges 26. The ridges 122 extend from adjacent abutment faces 120 to transverse margins of the halves of the separator 22. The inner sides of opposite halves of the separator 22 also have formed in them longitudinally extending grooves 128 which are positioned adjacent and parallel to the creases 106 and into which the nose portions 118 of the recesses 114 extend.

The undulations 112 form, at the outer sides 130 of the halves of the separator 22, transversely extending projectile-shaped mounds 132 (Fig. 10), the mounds of one half of the separator being alined with the mounds of the other half. The mounds 132 have formed between them transversely extending troughs 134 which are transversely alined with notches 136 respectively formed in longitudinal ridges 138 which are parallel to the creases 106 and to the hinge formed by said creases and which are positioned between the creases 106 and the mounds 132 of a corresponding or associated half of the separator and are substantially complemental to the grooves 128 formed at the inner sides 104 of the halves of the separator. The ridges 138 may be described as having formed in them longitudinally spaced transversely extending notches 136 arranged in transverse alinement with the troughs 134 which are longitudinally staggered with relation to the projectile-shaped recesses 114 at the inner sides of the halves of the separator.

The projectiles 108 of the high velocity 20 mm. cartridges 26 are placed manually in the recesses 114 of the lower half of each of the separators 22 positioned in the box 28 with rotating bands 140 of the projectiles engaging an outer edge of a horizontally disposed half of the separator, the upper half of the separator being disposed at approximately 60° to the lower half, as illustrated in Fig. 13. The cases 110 of the bottom layer of cartridges 26 and the separator 22 in which the projectiles 108 of the cartridges are positioned rest on the bottom of the carton 72 in the box 28, the hinge of the separator engaging one side wall of the carton 72 and the rim ends of the cases 110 of the cartridges engaging the opposite side wall of the carton. After folding down the upper half of the bottom separator another separator 22 is placed in the carton 72 with its hinge engaging said opposite side wall of the carton and the cases 110 of the cartridges 26 of the bottom layer fitting in the notches 136 and resting in the troughs 134 of the bottom half of the outer side 130 of the separator, the upper half of the separator being inclined at about 60° to the lower half of the separator as above described. The second separator 22 is then "filled" with cartridges 26, the projectiles 108 of said cartridges engaging in the recesses 114 of the lower half of the separator, the rim ends of the cases 110 of the cartridges engaging said one side wall of the carton 72 and the cases resting in the troughs 134 and in the notches 136 of the turned down upper half of the bottom separator. Another separator 22 is then positioned on the second layer of cartridges and is filled with cartridges 26 as above described, the operation being repeated until the fiberboard carton 72 in the container 52 of the box 28 has been filled. A sheet of fiberboard 142 is then placed upon the upper layer of cartridges in the carton 72 and the cover 54 of the box 28 is mounted upon and clamped to the container 52 of said box.

As above explained, when during the packing of cartridges 26 in the container 52 of the box 28 the upper half of the separator has been folded down upon the projectiles 108 of said cartridges, the abutment faces 120 of one-half of the separator being in engagement with the abutment faces of the other half of the separator, the gaps 126 are formed between the ridges 122 respectively of opposite halves of the separator. The weight of the cartridges 26 stacked in the carton 72, together with the pressure exerted against the layers of cartridges by reason of drawing down the cover 54 of the box 28 against the container 52 of said box, causes the spaced portions of opposite halves of the separators 22 firmly to grip the rear halves of the projectiles 108 of the cartridges, the fuse portions of the projectiles 108 of the cartridges 26 being snugly engaged by opposite portions of the halves of the separator but not being subject to any amount of pressure.

The notches 136 and the troughs 134 of the separators 22 are so arranged that even though there is substantial taper to the cases 110 of the cartridges 26, the axes 116 of said cartridges packed in the box 28 are substantially parallel. The longitudinal ridges 138 form upon the separator 22, after one-half of the separator has been folded over the other, tube portions to which the recesses 114 extend. By providing the ridges 138 in which are formed the notches 136, adjacent layers of cartridges packed in the box 28 by the use of the separators 22 may be arranged in longitudinally staggered relation, thereby facilitating the alinement of the cartridges in parallel relation in the box and also cushioning the cartridges in the box against damage in the event that the box is subjected to rough handling during shipment.

The cartridges 26 of adjacent layers of cartridges positioned in the box 28 by the use of the separators 22 may be defined as being arranged in parallel relation, the cartridges of one layer being staggered longitudinally as well as transversely with relation to the cartridges of adjacent layers. The troughs 134 and the notches 136 of each separator 22 may be defined as constructed and arranged to suport the cases 110 of cartridges 26, the projectiles 108 of which are enclosed in an adjacent separator 22, and to cooperate with said adjacent separator in positioning and maintaining in the box 28 the cartridges in substantially parallel relation and in positioning and maintaining the layers of cartridges in said box in longitudinally staggered relation with respect to cartridges of an adjacent layer in said box.

Having thus described our invention, what we claim as new and desire to secure by Letters Patent of the United States is:

1. A pulp separator for use in the packaging of cartridges, each of which includes a case and a projectile, a centrally disposed longitudinally extending hinge about which one-half of the separator may be folded with relation to the other half to move the inner sides of said halves into opposed relation, the inner sides of said halves of the separator having longitudinally spaced projectile-shaped recesses each of which is transversely alined with a recess in an opposite half and comprises a converging portion and a cylindrical portion and a lengthwise dimension of each of which is disposed at right angles to said hinge, inner sides of the halves of the separator having formed on them around the converging portions of the associated recesses abutment faces which are adapted to engage each other when one of said halves of the separator is folded onto the other half, thereby limiting folding movement of one of the halves of the separator toward the other, said inner sides of the halves of the separator also having formed on them between said cylindrical portions of the recesses, substantially parallel ridges offset from the plane of said abutment faces and extending from the abutment faces of corresponding halves of the separator to transverse margins of said halves and which, when said abutment faces of the halves of the separator are in engagement, are spaced slightly from one another.

2. A separator for use in the packaging of cartridges, each of which includes a case and a projectile, and comprising a centrally disposed longitudinally extending hinge which divides the separator into opposite halves and about which one of said halves of the separator may be folded over the other causing inner sides of said halves to be arranged in opposed relation, the inner sides of said halves of the separator having formed in them a plurality of longitudinally spaced transversely extending projectile-shaped recesses each of which is transversely alined with a recess in an opposite half and comprises a converging portion and a cylindrical portion and a lengthwise dimension of each of which is disposed at right angles to said hinge, and abutment faces which are formed on the inner side of each of said halves of the separator around the converging portions of the recesses of that half and which are adapted to engage the abutment faces of the other half to limit folding movement about said hinge of one of the halves of the separator toward the other, the inner sides of the halves of the separator also having formed on them between said cylindrical portions of said projectile-shaped recesses, substantially parallel ridges offset from the plane of said abutment faces and extending from the abutment faces of corresponding halves of the separator to transverse margins of said halves and which, when the abutment faces of opposite halves of the separator are in engagement, are spaced slightly from one another, outer sides of said halves of the separator having longitudinally spaced transversely alined troughs which are staggered longitudinally with relation to the cartridge receiving recesses at the inner sides of said halves, each of the outer sides of the halves of the separator also having formed on it a continuous longitudinal ridge which is parallel to the hinge, is arranged between the hinge and inner ends of the troughs of that half and which has formed in it longitudinally spaced transversely extending notches which are in transverse alinement respectively with troughs of that half, corresponding troughs and notches of each separator serving to support the cases of cartridges the projectiles of which are enclosed in an adjacent separator and to cooperate with said adjacent separator in positioning and maintaining in a box the cartridges in substantially parallel relation and in positioning and maintaining the layers of cartridges in said box in longitudinally and transversely staggered relation with reference to cartridges of an adjacent layer in said box.

References Cited in the file of this patent

UNITED STATES PATENTS

| | | |
|---|---|---|
| D. 142,118 | Parsons et al. | Aug. 14, 1945 |
| 1,913,650 | White | June 13, 1933 |
| 2,089,297 | Read et al. | Aug. 10, 1937 |
| 2,564,729 | Shepard | Aug. 21, 1951 |